H. M. DRAKE.
GARMENT STRETCHER.
APPLICATION FILED JAN. 7, 1916.
1,210,915.
Patented Jan. 2, 1917.
2 SHEETS—SHEET 1.
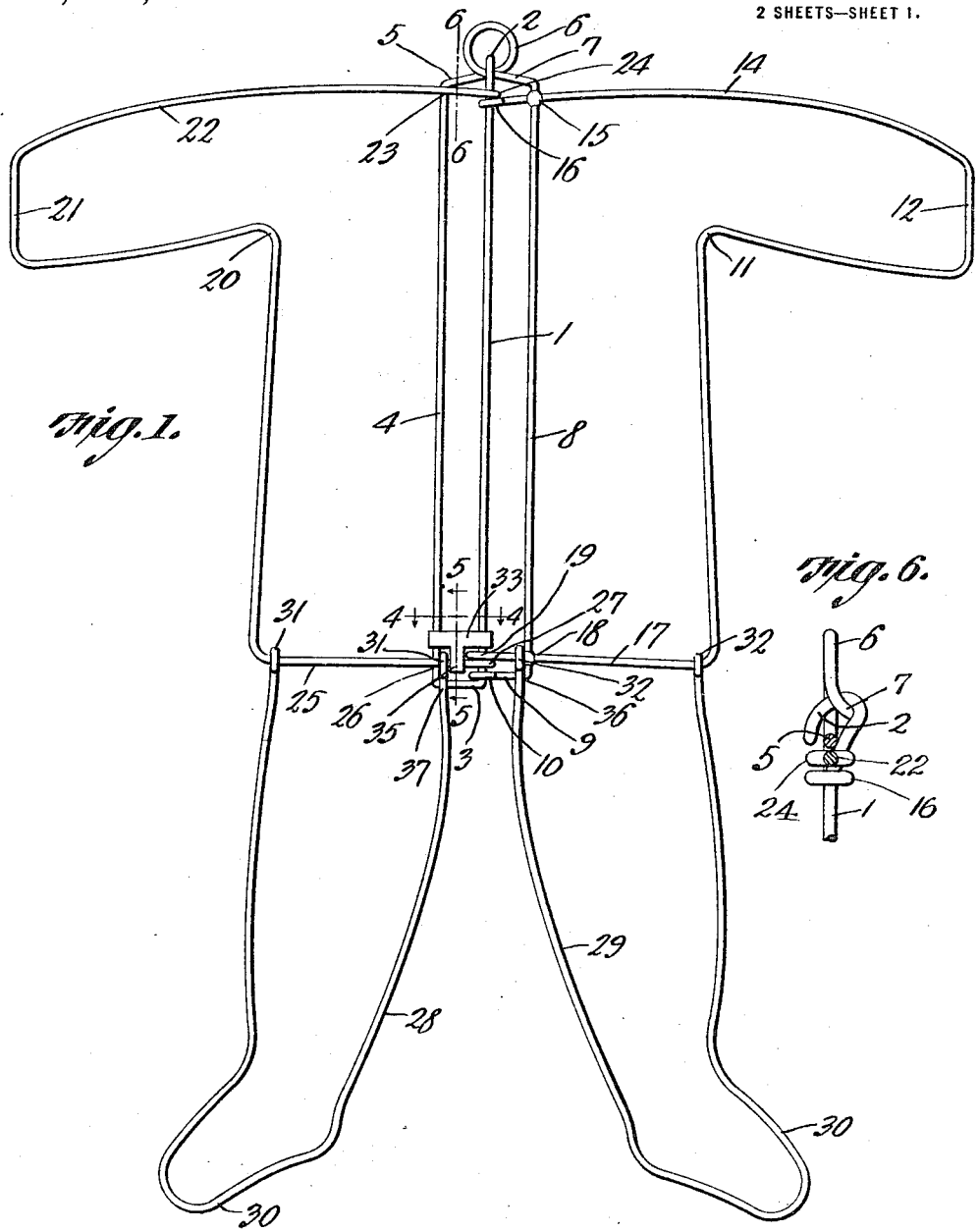

H. M. DRAKE.
GARMENT STRETCHER.
APPLICATION FILED JAN. 7, 1916.
1,210,915.
Patented Jan. 2, 1917.
2 SHEETS—SHEET 2.
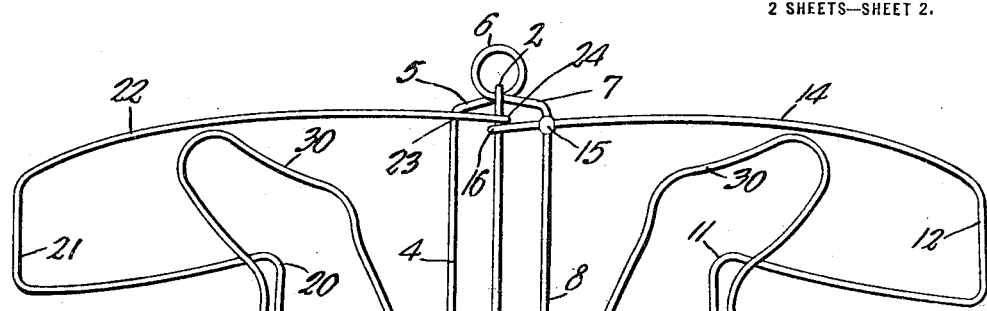
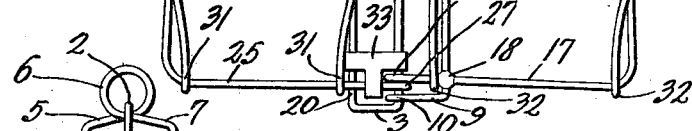
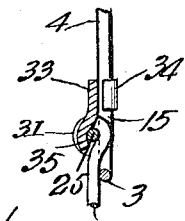
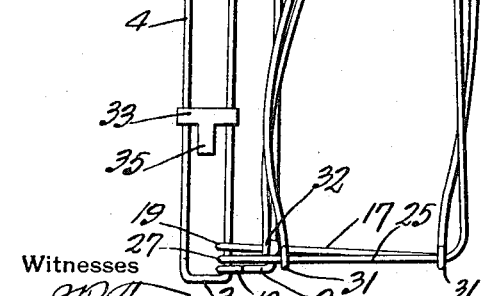
H. M. Drake, Inventor

UNITED STATES PATENT OFFICE.

HARRY M. DRAKE, OF DENVER, COLORADO.

GARMENT-STRETCHER.

1,210,915.  Specification of Letters Patent.  Patented Jan. 2, 1917.

Application filed January 7, 1916. Serial No. 70,813.

*To all whom it may concern:*

Be it known that I, HARRY M. DRAKE, a citizen of the United States, residing at Denver, in the county of Denver and State of Colorado, have invented a new and useful Garment-Stretcher, of which the following is a specification.

The device forming the subject matter of this application is adapted to be employed for stretching garments, such as union suits, either with or without feet, sweaters, shirts and the like, and stockings or socks.

The invention aims to provide a structure of this type which may be fashioned at a trifling expense out of wire or some similar material; to provide a stretcher of the type described which may be folded readily into small compass; to provide novel means whereby the body forming and arm carrying members may be locked with respect to each other in oppositely projecting positions; and, generally, to improve and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing: Figure 1 shows the invention in plan, extended and in the position which it will assume in use; Fig. 2 is a plan wherein the device has been partly folded; Fig. 3 is a plan wherein the structure is completely folded; Fig. 4 is a section on the line 4—4 of Fig. 1; Fig. 5 is a section on the line 5—5 of Fig. 1; Fig. 6 is a section on the line 6—6 of Fig. 1.

The device forming the subject matter of this application preferably is fashioned throughout from a wire or rod having some resiliency but stiff enough so that the structure which is made out of the rod or wire will not be distorted as the garment which is mounted thereon contracts during the drying operation.

The invention contemplates the use of a central frame which preferably is made from a single piece of material and embodies a middle bar 1 having a hook or eye 2 at its upper end. At its lower end, the middle bar 1 merges into a rectangularly disposed bottom piece 3 which is continued to form a side bar 4 disposed approximately parallel to the middle bar 1, the side bar 4 being extended to form a top piece 5 disposed approximately parallel to the bottom piece 3, the top piece 5 being crossed upon itself to form a suspension device preferably but not necessarily in the form of a ring 6, the ring 6 being continued to form a top piece 7 disposed approximately parallel to the bottom piece 3, the top piece 7 being carried downwardly to form a side bar 8 approximately parallel to the middle bar 1 and the side bar 4, the side bar 8 being continued to form a rectangularly disposed arm 9, approximately parallel to the bottom piece 3 and terminated in an eye 10 which grips the middle bar 1 close to the bottom piece 3 and preferably in abutment therewith.

The invention comprises an L-shaped body member 11 which is rigidly connected to the central frame above described, in a manner which will now be pointed out.

The body member 11 includes a loop-shaped arm extension 12 comprising a top strip 14 united by solder 15 or otherwise to the side bar 8 near to the top thereof, the top strip 14 terminating in an eye 16 which grips the middle bar 1 near to the hook 2, it being noted at this point, that the hook 2 engages the crossed portions of the ring 6 to hold them together. The body member 11 comprises a bottom strip 17 united by solder 18 to the side bar 8 near to the lower end of the side bar, the bottom strip 17 terminating in an eye 19 which grips the middle bar 1 in spaced relation to the eye 10.

The invention comprises an L-shaped body member 20 including a loop-shaped arm extension 21 embodying a top strip 22 bearing as shown at 23 against the side bar 4 when the structure is open as shown in Fig. 1, the top strip 22 terminating in an eye 24 engaged pivotally with the middle bar 1 intermediate the eye 16 and the ring 6. The body member 20 includes a bottom strip 25 which bears as shown at 26 against the side bar 4 near to the lower end thereof when the structure is open as shown in Fig. 1, the bottom strip 25 terminating in an eye 27 engaged pivotally with the middle bar 1 between the bottom piece 3 and the eye 19.

The invention comprises, further, legs 28 and 29, each of loop-shape and terminated at their lower ends in feet 30. At the upper ends of the leg 28, eyes 31 are formed, these eyes engaging pivotally with the bottom strip 25, in spaced relation. The leg 29 terminates at its upper ends in eyes 32 engaged pivotally with the bottom strip 17, one of the eyes 32 being pivotally assembled with the bottom strip 17 between the side bar 8 and the middle bar 1.

Mounted to reciprocate on the middle bar 1 and the side bar 4 is a latch 33 preferably in the form of a strip, provided at its ends with guides 34 adapted to reciprocate on the middle bar 1 and on the side bar 4. The latch 33 embodies a depending tongue 35 adapted to coact with the bottom strip 25 of the body member 20, in a manner which will be pointed out hereinafter.

When the structure is extended for use, as shown in Fig. 1, the coöperation between the several parts is as follows: The body members 11 and 20 project in opposite directions, the top strip 22 of the body member 20 engaging the side bar 4 as shown at 23 and the bottom strip 25 engaging the side bar 4 as shown at 26. Recalling that the body member 7 is rigidly secured to the central frame comprising the parts 4, 1 and 8, it will now be obvious that the body members 11 and 20 cannot swing backwardly. Neither can they swing forwardly, because the latch 33 may be lowered until the tongue 35 thereof engages across the bottom strip 25 of the body member 20, as clearly shown in Fig. 1 and as illustrated in Fig. 5. The legs 28 and 29 hang in depending positions, and the legs cannot swing backwardly, because the inner member of the leg 29 bears against the arm 9 as shown at 36, the inner member of the leg 28 bearing against the bottom piece 3, as shown at 37.

In order to fold the structure, the legs 28 and 29 are swung upwardly into parallelism with the body members 11 and 20, as shown in Fig. 2, the eyes 31 and 32 pivoting respectively on the bottom strip 25 and on the bottom strip 17. The latch 33 may be raised until its tongue 35 no longer engages the bottom strip 25 of the body member 20. Thereupon, the body members 11 and 20 may be folded into parallelism, as indicated in Fig. 3, to inclose between them, the upwardly folded legs 28 and 29, the body member 20 pivoting at the connections represented by the eyes 24 and 27 upon the middle bar 1. The structure now appears in the compact form delineated in Fig. 3.

The general purpose of an article of this type is well understood, but it may be stated that a garment or a plurality of garments, having been washed, may be stretched during the drying operation upon the structure when the latter is disposed as shown in Fig. 1, the device being effective to hold against shrinking, the body portion, the arms, the legs and the feet of a garment.

Having thus described the invention, what is claimed is:—

1. A garment stretcher comprising a pair of body members; means for pivotally connecting the body members whereby the body members may be folded together along a longitudinal line; and a leg pivoted to the lower end of each body member, the legs being upwardly foldable to lie between the body members when the body members are folded.

2. A garment stretcher comprising a pair of body members; means for pivotally connecting the body members whereby the body members may be folded together along a longitudinal line; a leg pivoted to the lower end of each body member, the legs being upwardly foldable to lie between the body members when the body members are folded; and a latch carried by said means and coöperating with one of the body members to hold the body members extended and in approximate alinement.

3. In a garment stretcher, a central frame comprising inner and outer parts; a body member projecting in one direction from the frame; a second body member projecting in an opposite direction and pivotally assembled with the inner part of the frame, the second body member engaging the outer part of the frame to prevent the second body member from swinging rearwardly; and a latch carried by the frame and engaging the second body member, to prevent the latter from swinging forwardly.

4. In a garment stretcher, a central frame comprising inner and outer parts; a body member projecting in one direction from the frame; a second body member projecting in an opposite direction and pivotally assembled with the inner part of the frame, the second body member engaging the outer part of the frame to prevent the body member from swinging rearwardly; and a latch slidable longitudinally on the inner and outer parts of the frame, the latch embodying means for engaging the second member to prevent the second member from swinging forwardly.

5. In a garment stretcher, a central frame embodying three approximately parallel bars connected by bottom strips; a body member projecting in one direction from the frame; a second body member pivotally connected with one of the bars, whereby the body members may be folded together; and legs pivoted at their upper ends to the lower ends of the body members and adapted to be folded between the body members when the body members are folded, the legs coacting with the bottom strips, to prevent the legs from swinging rearwardly, when the stretcher is extended.

6. In a garment stretcher, a central frame comprising three approximately parallel bars connected at their lower ends by bottom strips; a body member projecting in one direction from the frame; a second body member having its inner ends pivoted to the intermediate one of the said bars and adapted to engage one of the outer of said bars, to prevent the second body member from swinging rearwardly; and legs pivoted to the lower ends of the body members, the legs engaging the bottom strips to prevent the legs from swinging rearwardly, when the structure is extended.

7. In a garment stretcher, a central frame including three approximately parallel bars connected by bottom strips; a body member projecting in one direction from the frame; a second body member provided at its inner ends with means for pivotally engaging the central one of the said bars, whereby the body members may be folded together, the second body member coacting with one of the outer of said bars, to prevent the second body member from swinging rearwardly; a latch slidable upon the central bar and upon one of the side bars and coacting with the second body member to prevent the same from swinging forwardly; and legs pivoted at their upper ends to the lower ends of the body members and adapted to be folded between the body members when the body members are folded together, the legs engaging the bottom strips to prevent the legs from swinging rearwardly when the stretcher is extended.

8. In a garment stretcher, a central frame embodying a middle bar extended laterally at its lower end to form a bottom piece, the bottom piece being extended to form a side bar disposed approximately parallel to the middle bar, the side bar being prolonged to form a top-piece having a suspension device interposed therein, the upper end of the middle bar being assembled with the suspension device, the top piece being prolonged downwardly to form a second side bar disposed approximately parallel to the middle bar, the second side bar being extended to form an arm assembled with the middle bar and disposed approximately parallel to the bottom piece; a body member rigidly assembled with the middle bar and with one side bar; a second body member provided at its inner ends with means for pivotally engaging the middle bar, the second body member being adapted to engage the other of the side bars to prevent the second body member from swinging rearwardly; and a latch slidable on the middle bar and on the said other bar and adapted to coact with the bottom portion of the second body member, to prevent relative forward movement between the body members.

9. A garment stretcher comprising a pair of body members; means for pivotally connecting the body members whereby the body members may be folded together along a longitudinal line; and a leg pivoted to the lower end of each body member, the legs being upwardly foldable to overlap the body members before the body members are folded.

In testimony that I claim the foregoing as my own, I have hereto affixed my signature in the presence of two witnesses.

HARRY M. DRAKE.

Witnesses:
WM. D. MARSH,
D. E. DAVIS.

Copies of this patent may be obtained for five cents each, by addressing the "Commissioner of Patents, Washington, D. C."